United States Patent [19]
Felcman et al.

[11] Patent Number: 6,122,173
[45] Date of Patent: Sep. 19, 2000

[54] DRIVE LATCH MECHANISM FOR COMPUTER SELECTIVELY CONFIGURABLE IN BOTH DESKTOP AND TOWER ORIENTATIONS

[75] Inventors: Francis A. Felcman, Rosenberg; Donald J. Hall, Houston; Arthur K. Farnsworth, Spring, all of Tex.

[73] Assignee: Compaq Computer Corporation, Houston, Tex.

[21] Appl. No.: 09/227,047

[22] Filed: Jan. 7, 1999

Related U.S. Application Data

[63] Continuation-in-part of application No. 09/038,643, Mar. 11, 1998.

[51] Int. Cl.[7] .......................................................... G06F 1/16
[52] U.S. Cl. .......................... 361/726; 361/683; 361/679; 361/681; 361/684; 361/685; 312/223.1
[58] Field of Search .................................... 361/726, 683, 361/679, 684, 685; 312/223.2

[56] References Cited

U.S. PATENT DOCUMENTS

| 5,513,068 | 4/1996 | Girard | 361/685 |
| 5,748,442 | 5/1998 | Toor | 361/685 |
| 5,754,396 | 5/1998 | Felcman et al. | 361/683 |

OTHER PUBLICATIONS

U.S. Application Ser. No. 09/060,065 filed Apr. 14, 1998, pending.
Public Computer Disclosure set forth in accompanying IDS.

*Primary Examiner*—Gerald Tolin
*Assistant Examiner*—Yean-Hsi Chang

[57] ABSTRACT

A computer may be easily user re-configured between desktop and tower housing orientations, with a group of the computer's front side drive units being horizontally disposed in each orientation, using a specially designed drive unit support and latch structures. A square opening is formed in the front exterior wall of the housing, and the support apparatus includes spaced apart channel structures extending inwardly into the housing from the four sides of the wall opening, with opposing pairs of the channel structures being adapted to slidably receive corresponding projections on opposite side edge portions of the drive units. In this manner, each front side drive unit in the group thereof can be supported at the opening in a first orientation in which the drive unit will be horizontally oriented with the computer in a desktop orientation, or a second orientation in which the drive unit will be horizontally oriented with the computer in a tower orientation. As a particular drive unit is inserted in either orientation, a resilient latch structure is deflected by the drive unit and then releasably locks it into place. The latch structure is defined by two perpendicular, spring-loaded latch members which are cammingly interconnected in a manner such that a drive-releasing movement of one of the latch members simultaneously forces the other latch member through its drive-releasing movement.

36 Claims, 8 Drawing Sheets

DRIVE LATCH MECHANISM FOR COMPUTER SELECTIVELY CONFIGURABLE IN BOTH DESKTOP AND TOWER ORIENTATIONS

CROSS-REFERENCE TO RELATED APPLICATION

This application is a continuation-in-part of copending U.S. application Ser. No. 09/038,643 filed on Mar. 11, 1998 and entitled "COMPUTER SELECTIVELY CONFIGURABLE IN BOTH DESKTOP AND TOWER ORIENTATIONS".

BACKGROUND OF THE INVENTION

1. Field of the Invention

The present invention generally relates to computer apparatus and, in a preferred embodiment thereof, more particularly provides apparatus for supporting externally insertable drive units in a computer in a manner permitting a user to selectively configure his computer in either a desktop or tower configuration.

2. Description of Related Art

The operating components of a full size personal computer (i.e., a nonportable computer) are typically disposed within an elongated rectangular CPU housing, with the computer being sold to the consumer in either a "desktop" configuration or a "tower configuration". With the computer in its desktop configuration the housing is horizontally rested on a work surface (such as a desktop area) with the shortest side-to-side dimension of the rectangular housing extending vertically, and the front side of the computer housing facing the user. With the computer in its tower configuration the housing is supported on one of its sides in a vertical orientation on the work surface or on the floor, with the shortest dimension of the rectangular housing extending horizontally and the drive access at the top end of the computer.

The front side of the housing typically has an opening formed therein through which one or more drive units, such as a hard disk drive, a floppy disk drive and a CD ROM drive may be inserted. Each inserted drive unit is suitably supported within the housing and has a front side that extends across the front side housing opening to facilitate user access to the drive unit, and the inserted drive units are electrically coupled to associated circuitry within the housing in an appropriate manner.

For a variety of reasons it is desirable and conventional to horizontally orient the drive units relative to the user such that the rotational axes of the units are vertically oriented. In the case of a CD ROM drive such orientation is desirable to present the compact disc-supporting tray portion of the drive in a horizontal orientation to underlie and hold the disc when the tray is moved outwardly toward the user and then retracted into the CD ROM drive. While externally insertable hard disk drives may be mounted either horizontally or vertically, they are conventionally mounted horizontally as are floppy disk drives which are generally perceived to be easier to use in their conventional horizontal orientations.

Some computer purchasers prefer their computer to be in a horizontal desktop configuration, while other purchasers prefer the vertical tower configuration for their computer. Moreover, it often happens that due to subsequent changes in work space configuration or other factors a user may wish to use his desktop computer in a tower configuration or vice versa.

Heretofore, it was either difficult or simply not feasible for a user to convert his or her computer from one of these configurations to the other configuration in a manner keeping the front side drive units in the desired horizontal orientations thereof in both the desktop and tower positions of the CPU housing. To do so requires rotating the drive units ninety degrees relative to the housing when the housing is switched from its horizontal desktop position to its vertical tower position or vice versa.

In the past, computer manufacturers provided purchasers with a choice between desktop and tower housing configurations—neither of which could be modified by the user to change it to the other configuration. Simply stated, if a purchaser, for example, bought a desktop computer and later wanted a tower computer he or she had to purchase a separate tower computer.

Later, some manufacturers began to use the same housing for both desktop and tower computers. This was achieved by providing a drive unit support structure that could be rotated ninety degrees relative to the housing to horizontally orient the drive units relative to the user regardless of whether the housing was to be used in a desktop or tower orientation. While it was possible for a user to convert the purchased computer from one of these orientations to the other orientation, it was quite difficult and involved purchasing a new front bezel and drive support parts for the computer and then reorienting the drive support structure within the housing and installing the new bezel in place of the original one. As might be imagined, these difficulties discouraged many computer owners from attempting to convert their computer from a desktop configuration to a tower orientation or vice verse.

In view of the foregoing it can be readily seen that a need exists for a computer which may be more easily converted by a user from either a desktop or tower configuration to the other configuration in a manner maintaining the front side drive units in a horizontal orientation in each configuration. It is to this need that the present invention is directed.

SUMMARY OF THE INVENTION

In carrying out principles of the present invention, in accordance with a preferred embodiment thereof, electronic apparatus is provided which is representatively in the form of a specially designed computer which may be reconfigured by it user between horizontal desktop and vertical tower configurations.

In a preferred embodiment thereof, the computer includes a housing having a first exterior wall with an opening therein, and a second exterior wall transverse to the first exterior wall. A modular device, representatively a drive unit, has a side and is insertable inwardly through the housing wall opening in a selectively variable one of (1) a desktop orientation in which the modular device side is parallel to the second exterior wall of the housing, and (2) a tower orientation in which the modular device side is transverse to the second exterior wall.

The computer also includes a support structure operative to support the inserted modular device in either of its desktop and tower orientations, and a specially designed reconfigurable bezel assembly which is removably securable to the outer side of the first housing exterior wall and serves to block off an area of the underlying housing opening unoccupied by an inserted modular device.

The housing opening preferably has a square configuration, and the support structure includes opposing pairs of slots extending inwardly from opposing sides of the housing opening into the interior or the housing and configured to slidably receive mounting projections on opposite side edge portions of the inserted modular device in both its desktop and tower orientations.

The bezel structure preferably includes a plate-shaped bezel body having a square opening therein and being removably securable to the outer side of the first exterior housing wall in a manner such that the bezel body opening outwardly overlies the housing opening. A square frame is removably snap-fittable into an inner side recess formed in the bezel body and extending around its opening, and an elongated rectangular plate is removably snap-fittable onto the frame in two mutually perpendicular orientations thereon.

To reconfigure the computer from, for example its desktop orientation to its tower orientation, the bezel assembly is removed from the outer side of the first exterior housing wall, and the modular device (presently in its desktop orientation relative to the computer housing) is electrically and mechanically uncoupled from the housing and pulled outwardly through the housing opening. The removed modular device is then positioned in its tower orientation relative to the housing, inserted into the housing, and then again appropriately coupled to the electrical circuitry within the housing.

To accommodate the now reoriented modular device, the removed bezel assembly is reconfigured by removing the frame from the bezel body, rotating the removed frame ninety degrees relative to the bezel body, and then snapping the reoriented frame back into the body recess to correspondingly reposition the blank-off plate relative to the bezel body so that when the bezel assembly is replaced on the housing the blank-off plate will cover the now repositioned portion of the housing wall opening unoccupied by the reoriented modular device supported therein.

After the reconfigured bezel assembly is reinstalled on the housing the housing may be rotated ninety degrees from its previous horizontal desktop orientation and placed atop a support surface in its new vertical tower orientation. The user of the computer may simply repeat the simple reconfiguration process described above to place the computer back in its previous desktop orientation.

This unique user reconfiguration of the computer selectively between desktop and tower orientations thereof is conveniently accomplished using the same computer housing, and does not require any special tools or modification of the modular device support structure within the housing. This reconfiguration method may be used with one or more modular devices, such as floppy disk drives, hard disk drives, CD ROM drives or other storage media drive units being operatively received and supported within the housing opening.

According to another aspect of the invention, a specially designed latch structure is provided for releasably latching an inserted modular device within the housing in either of the modular device's desktop and tower orientations. The latch structure has a single portion which is movable to permit removal of the releasably latched modular device in either of its desktop and tower orientations.

Representatively, the latch structure includes first and second transverse latch members respectively movable relative to the housing in unlatching directions parallel to and transverse to the aforementioned second exterior housing wall. The first and second latch members have cooperatively engaged portions operative to move the second latch member in its unlatching direction in response to movement of the first latch member in its unlatching direction, and the first and second transverse latch members are resiliently biased toward latching positions thereof.

In a preferred embodiment of the latch structure, each of the first and second latch members is elongated in its latching direction and is slidably supported for movement between the latching and unlatching position of the latch member. Additionally, each of the first and second latch members has a locking structure thereon which is configured to be engaged by a portion of the inserted modular device in a manner deflecting the latch member from its latching position to its unlatching position and then permitting it to be resiliently driven back to its latching position to thereby releasably retain the inserted modular device within the housing. In the preferred embodiment of the latch structure, the first latch member has a cam structure thereon which, in response to movement of the first latch member from its latching position to its unlatching position, engages a portion of the second latch member and drives the second latch member from its latching position to its unlatching position to thereby permit removal of the unlatched modular device.

DETAILED DESCRIPTION

Figure 1A:
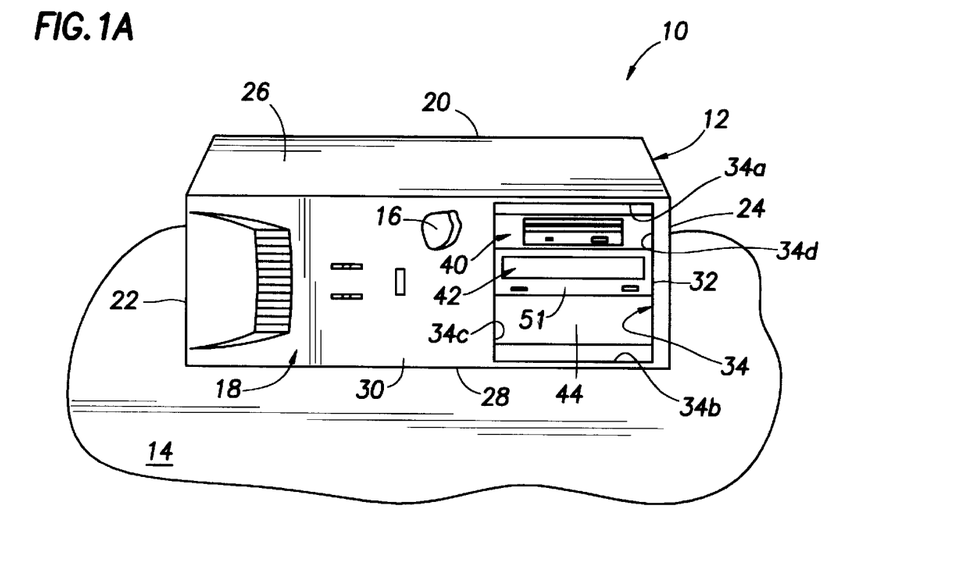
FIGS. 1A and 1B perspectively illustrate a specially designed computer which may be easily converted by a user between a horizontally orientable desktop configuration (FIG. 1A) and a vertically orientable tower configuration (FIG. 1B)
Figure 1B:
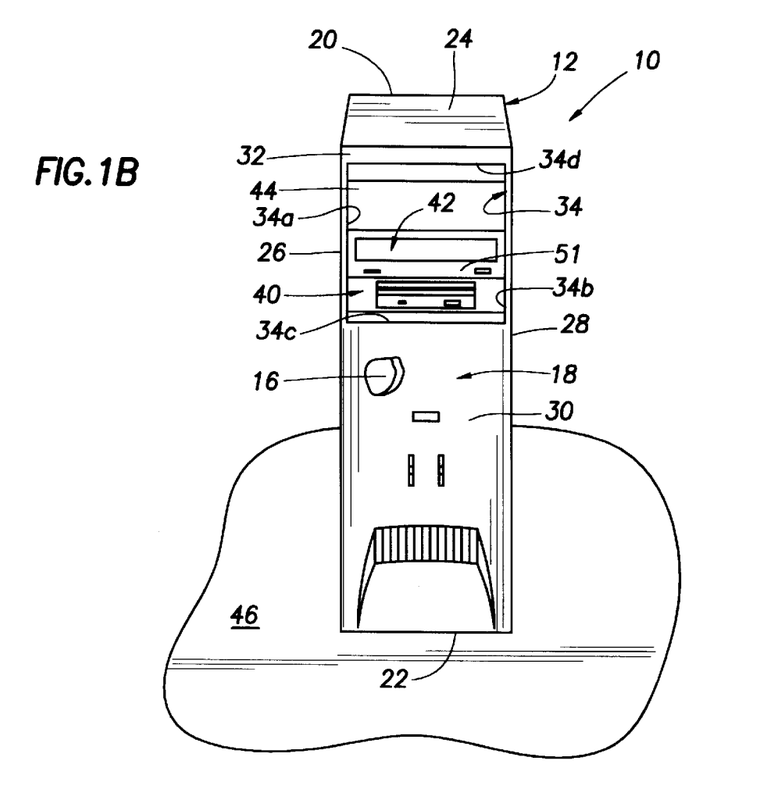

Perspectively illustrated in FIGS. 1A and 1B is a personal computer 10 embodying principles of the present invention. According to a key aspect of the invention, the computer 10 has an elongated rectangular housing 12 which may be easily converted by a user of the computer between a horizontal desktop configuration as shown in FIG. 1A, and a vertical tower configuration as shown in FIG. 1B.

Referring first to FIG. 1A, the housing 12 in its horizontal desktop configuration is shown placed atop a horizontal support surface such as a desktop 14, and has a vertically extending outer front side wall 16 covered by a subsequently described bezel assembly 18 removably secured to its outer side; a vertically extending outer rear side wall 20; opposite vertically extending outer left and rear end walls 22 and 24; and horizontally extending outer top and bottom side walls 26 and 28. As can be seen, with the housing 12 in its horizontal desktop orientation, the vertical height of the housing is less than its horizontal width and depth.

Figure 3A:
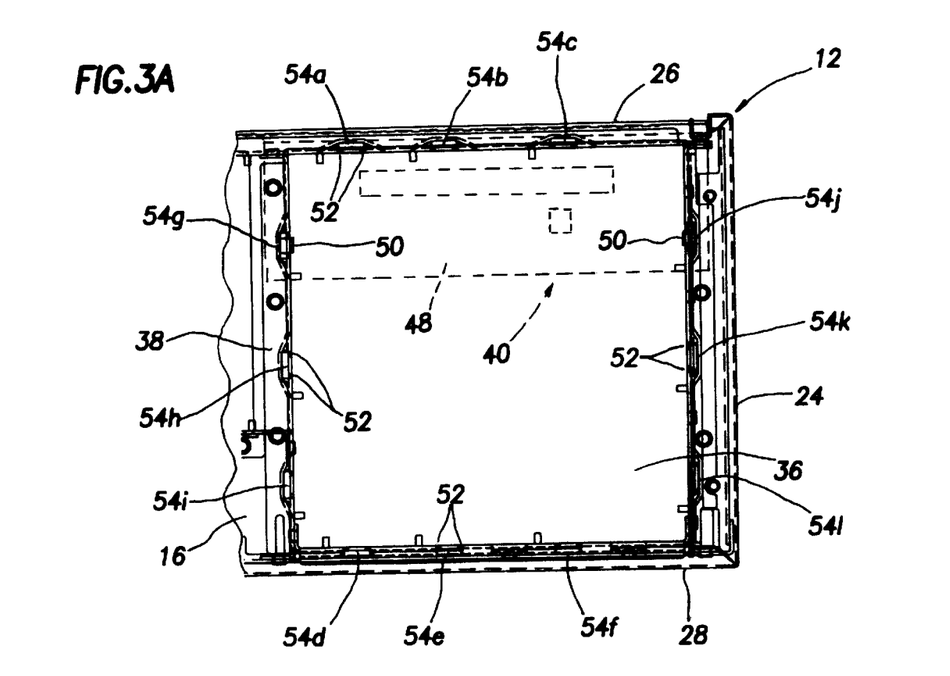
FIGS. 3A and 3B are enlarged front side elevational views of a front exterior side wall opening and associated drive support structure in the computer and respectively illustrate, in phantom, the desktop and tower mounting orientations of the installed drive unit.
Figure 4:
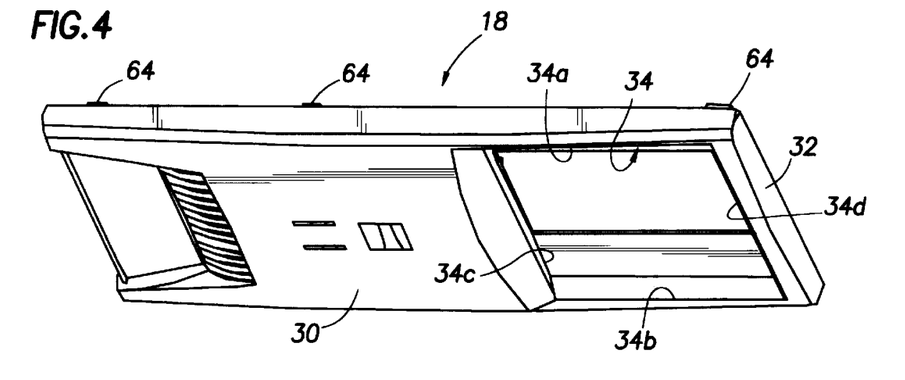
FIG. 4 is a front side perspective view of a specially designed reconfigurable bezel structure removed from the front exterior side wall of the computer housing, the bezel structure being oriented in its desktop configuration.

The bezel assembly 18 includes a horizontally elongated plastic base plate or body member 30 having, adjacent its right end 32, a square opening 34 (see also FIGS. 5A and 5B) having opposite top and bottom sides 34a,34b and opposite left and right sides 34c,34d as viewed in FIGS. 1 and 4. Bezel body member opening 34 outwardly overlies and is generally aligned with a square opening 36 (see FIGS. 2A and 3A) formed in the front housing wall 16 and bounded by housing walls 24,26,28 and a vertical interior housing wall 38 extending rearwardly from the opening 36 into the interior of the housing 12.

With the computer housing 12 in its FIG. 1A horizontal desktop configuration, modular devices, representatively a pair of drive units 40 and 42, are horizontally oriented within the housing opening 36, project into the interior of the housing 12, and are visible and operable through the bezel body opening 34. Illustratively, drive unit 40 is a floppy disk drive and extends inwardly into the housing 12 through a top portion of the housing opening 36, and the drive unit 42 is a CD ROM drive and extends inwardly into the housing 12 through a vertically intermediate portion of the housing opening 36. With both of the drive units 40,42 installed in the housing 12 a gap is left at the bottom side of the housing 12 and is configured to accept another drive unit, such as a hard disk drive to supplement at least one other hard drive (not shown) operatively mounted within the interior of the housing 12. This gap in the square housing opening 36 below the installed CD ROM drive 42 is covered, as subsequently described herein, by a horizontally elongated plastic blank-off plate portion 44 of the bezel assembly 18.

As noted above, with the computer housing 12 in its FIG. 1A horizontal desktop orientation the installed drive units 40,42 are horizontally disposed relative to the user of the computer—i.e., the top and bottom sides of the drive units 40,42 are parallel to the horizontal top and bottom outer side walls 26,28 of the computer housing 12. Using specially designed features of the housing 12 and the bezel assembly 18, the present invention uniquely permits a user of the computer 10 to readily reconfigure the computer in a vertically oriented tower configuration, as shown in FIG. 1B, in which the housing may be rested on its end wall 22 atop a horizontal support surface, such as a desktop 14 or floor 46 (as shown in FIG. 1B), with the drive units 40,42 in a horizontal orientation such that the top and bottom sides of the drive units 40,42 are parallel to the now horizontal outer end walls 22,24 of the housing 12.

Turning now to FIGS. 2A–3B, the floppy disk drive unit 40 is of a generally rectangular configuration, having an elongated rectangular bezel plate 48 on its front side, and a spaced pair of outwardly projecting cylindrical mounting structures 50 (representatively the heads of a pair of mounting screws) on opposite side edge portions thereof. The CD ROM drive 42 is similarly configured and has a front side bezel plate 51 (see FIGS. 1A and 1B) and mounting screw heads (not shown) projecting outwardly from opposite outer side edges thereof.

Formed on the inner side of each of the housing walls 24,26,28 and 38 are three sets of spaced apart opposing flanges 52 which form slots 54 extending rearwardly into the interior of the housing 12 and are configured to slidingly receive the cylindrical mounting screw heads 50 on the floppy disk drive 40 and the similarly configured screw heads (not illustrated) on the CD ROM drive 42. The slots 54a–54c on the top side of the housing opening 36 respectively oppose the slots 54d–54f on the bottom side of the housing opening 36, while the slots 54g–54i on the left side of the housing opening 36 respectively oppose the slots 54j–54l on the right side of the housing opening 36.

Figure 2A:
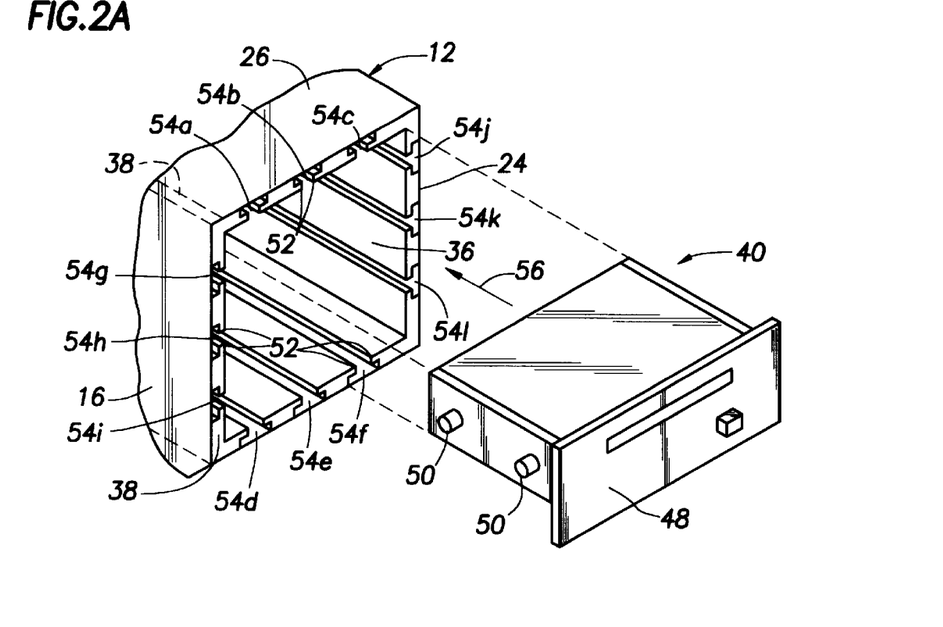
FIGS. 2A and FIG. 2B are simplified perspective views of a corner portion of the computer, with its front bezel assembly removed, and respectively illustrate the installation therein of a representative drive unit in mutually perpendicular desktop and tower orientations.
Figure 2B:
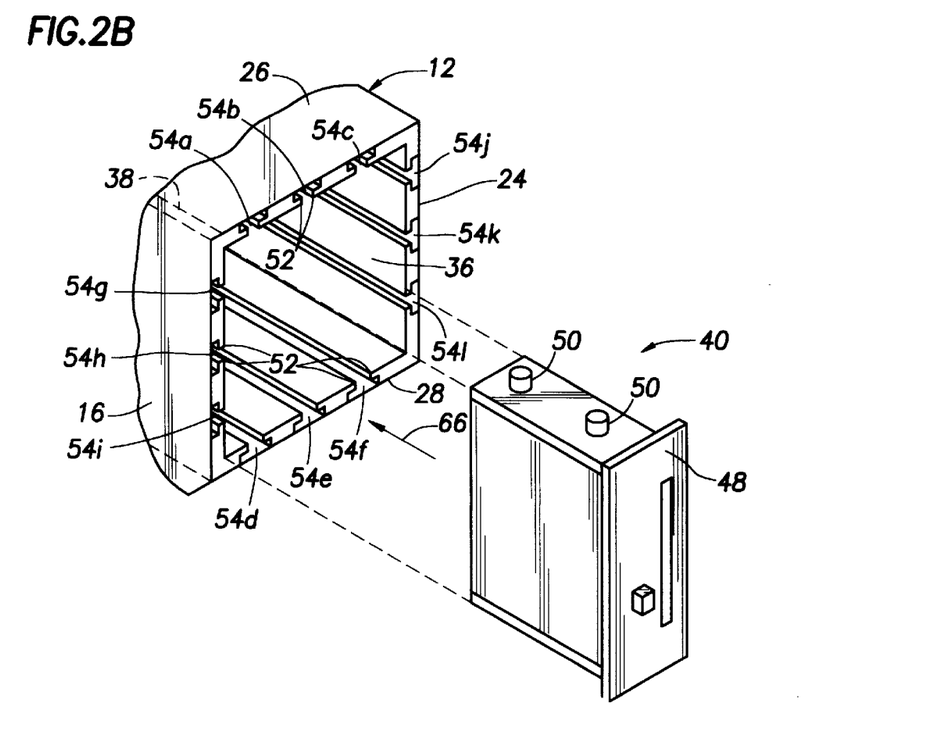

With the bezel assembly 18 removed from the outer side of the front housing side wall 16, to place the computer housing 12 in its FIG. 1A horizontal desktop configuration the floppy disk drive 40 is rearwardly inserted into the housing opening 36, as indicated by the arrow 56 in FIG. 2A in a manner causing the mounting screw heads 50 on the opposite side edges of the floppy disk drive 40 to enter the horizontally opposed flange slots 54g,54j as indicated in FIG. 3A, and positioning elongated the floppy drive front side bezel plate 48 to longitudinally extend horizontally along a top side portion of the housing opening 36 as shown in phantom in FIG. 3A. The CD ROM drive unit 42 (not shown in FIGS. 2A and 3A) is then rearwardly inserted into the housing opening in a similar manner, below the floppy disk drive 40, to cause the mounting screw heads on the CD ROM drive 42 to slidingly enter the horizontally opposed slot pair 54h,54k. The inserted drive units 40,42 may then be electrically coupled to the circuitry within the housing 12 using suitable connector cables. Drive units 40,42 are retained within the housing 12, with the drive unit front bezel plates 48,51 extending across an upper portion of the housing opening 12, by additional mounting screws or suitable latch means disposed within the housing and functioning to releasably retain the inserted drive units in place within the housing.

Figure 5A:
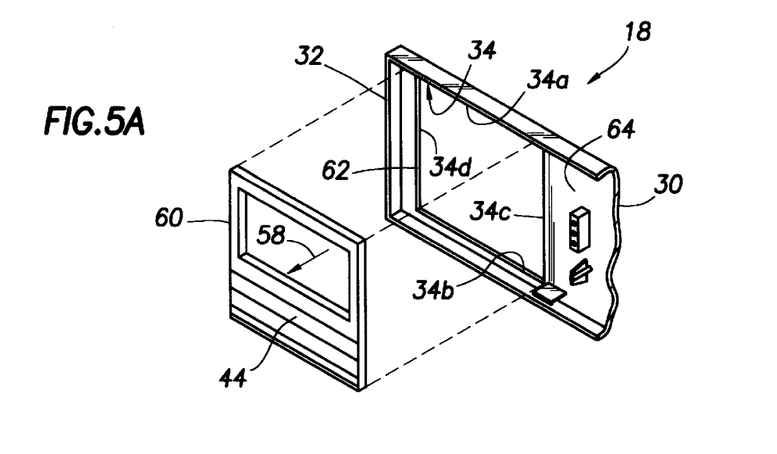
FIGS. 5A and 5B are simplified, partially exploded rear side perspective views of an end portion of the bezel structure respectively illustrating a removable frame and blank-off portion of the bezel structure in their desktop and tower orientations relative to the main body portion of the bezel structure.

With the drive units 40,42 installed in this manner, a gap is left in the housing opening 36 beneath the CD ROM drive unit 42 as previously mentioned, such gap being covered by the bezel blank-off plate 44 as shown in FIG. 1A. Turning now to FIG. 5A, as indicated by the arrow 58, the blank-off plate 44 is snap-fitted forwardly into a bottom side portion of a square frame member 60 which is then snap-fitted into a square well area 62 formed in the rear side 64 of the bezel body member 30 around its opening 34. With the frame 60 received in the well area 62 the blank-off member 44 longitudinally extends along the opening 34 adjacent its bottom side 34b. The bezel body 30 is then removably snap-fitted onto the outer side of the front housing wall 16, using resilient tabs 64 formed on the back side of the bezel body 30 (see FIG. 4) and snapped into corresponding slots (not shown) formed in the front housing wall 16, to place the computer 10 in its FIG. 1A horizontal desktop configuration.

Figure 3B:
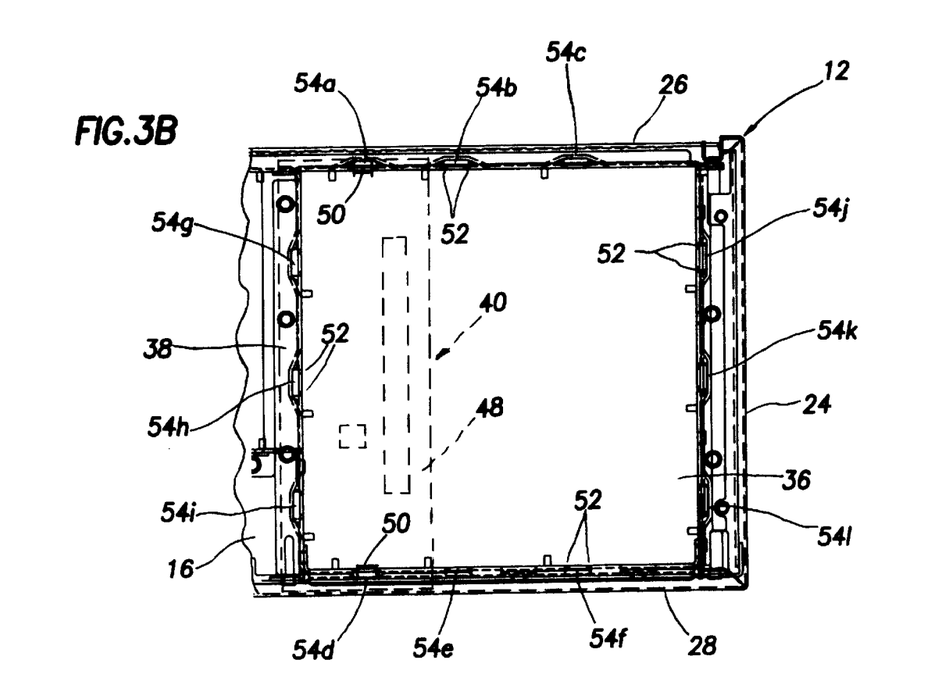

When it is desired to convert the computer 10 to its FIG. 1B vertical tower configuration, the bezel assembly 18 is removed from the front housing side wall 16, and the inserted drive units 40,42 are mechanically and electrically uncoupled from the housing 12 and pulled forwardly out of the housing opening 36. Drive unit 40 is then rotated from its FIG. 2A horizontal orientation to its FIG. 2B vertical orientation and reinserted into the housing opening 36, as indicated by the arrow 66 in FIG. 2B, to cause the upper and lower mounting screw heads 50 to be slidingly received in the opposing top and bottom side slots 54a,54d as shown in FIG. 3B. A similar rotation and reinsertion of the drive unit 42 is carried out in a manner such that its mounting screw heads are received in the top and bottom side slots 54b,54e. After such reinsertion of the reoriented drive units 40,42 they are again cabled to the internal circuitry within the housing 12.

Figure 5B:
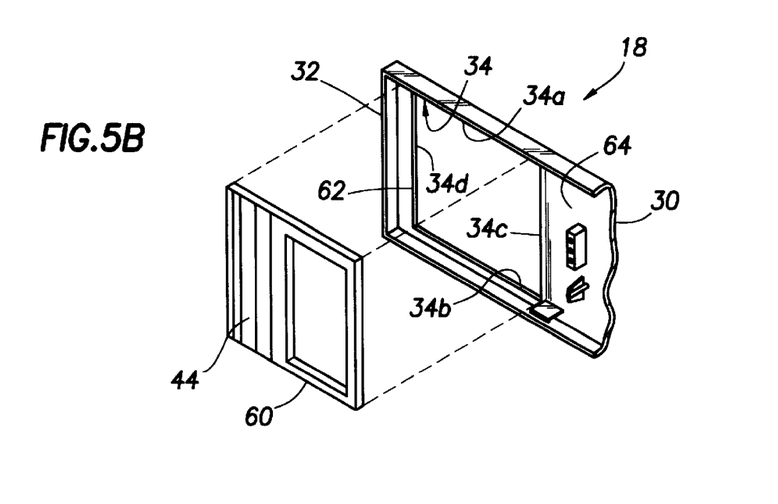

Next, in the removed bezel assembly 18, the frame member 60 is removed from the bezel body well area 62 as shown in FIG. 5A, rotated ninety degrees to its FIG. 5B orientation, and snapped back into place within the well area 62 to position the now reoriented blank-off plate 44 so that it is positioned adjacent the end 32 of the bezel body member 30 and longitudinally extends between the opposite sides of the bezel body member opening 34. The bezel assembly 18 is then snapped back into place on the outer side of the front housing wall 16, and the now reconfigured computer 10 is tilted upwardly to its FIG. 1B tower configuration and the housing end wall 22 is rested upon the support surface 46.

In this tower configuration of the computer 10, the drive units 40,42 are horizontally positioned relative to the user of the computer, and the blank-off plate 44 covers the area of the underlying portion of the housing open in a 36 which is unblocked by the drive units 40,42. If it is later desired to convert the computer back to its FIG. 1A desktop configuration the process is simply repeated by (1) removing and reconfiguring the bezel assembly 18, (2) removing, reorienting and reinstalling the drive units 40 and 42, and (3) replacing the reconfigured bezel assembly 18.

As can be readily seen from the foregoing, this reconfiguration of the computer 10 between desktop and tower orientations thereof may be easily and quickly carried out by the user of the computer using the same housing and without the necessity of using any special tools or reconfiguring the drive support structure within the computer.

Figure 6:
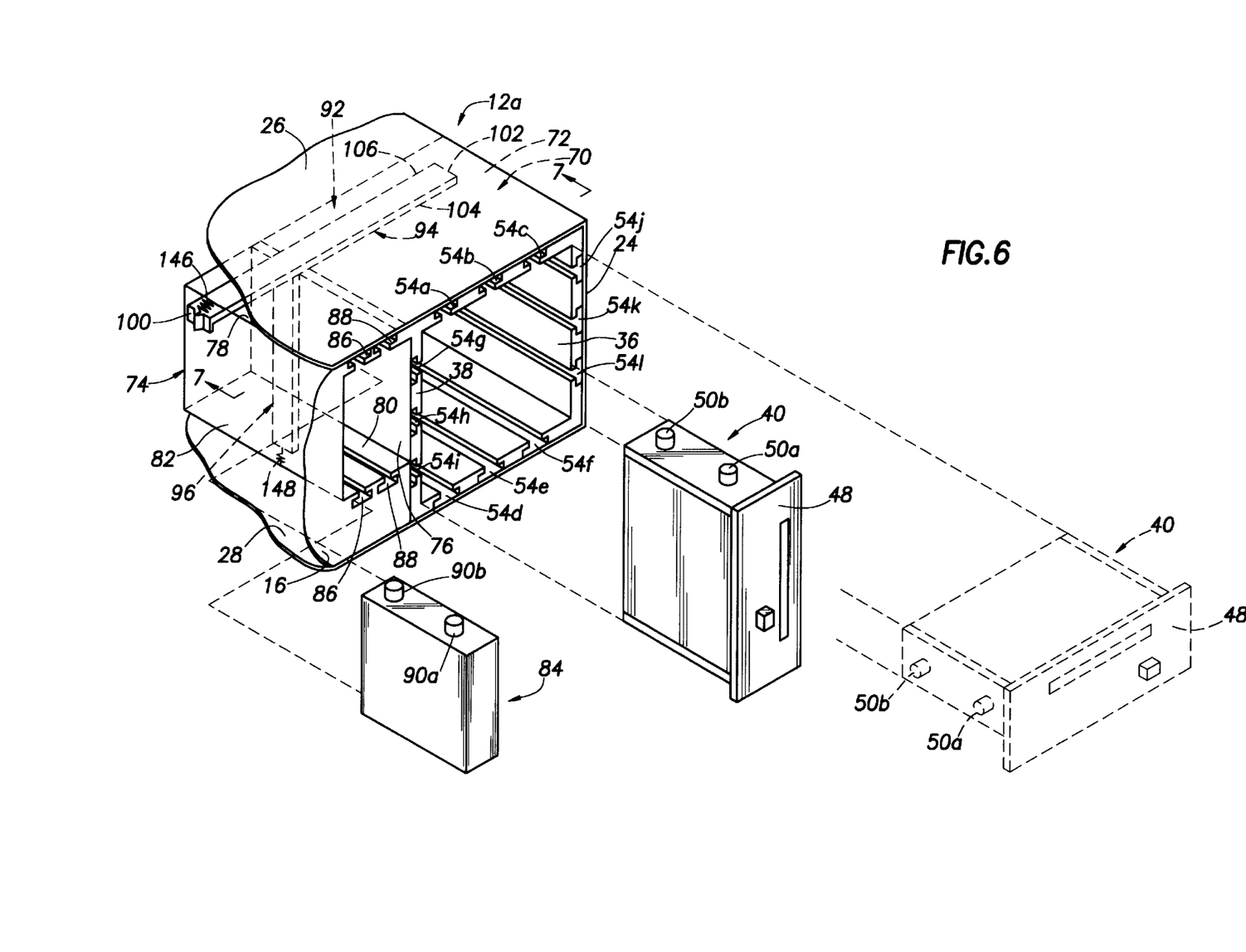
FIG. 6 is a simplified perspective view of a corner portion of an alternate embodiment of the computer housing, with its front bezel assembly removed, and illustrates representative drive units removably installable in a drive support structure portion of the housing having associated therewith a specially designed drive latch mechanism embodying principles of the present invention.
Figure 7:
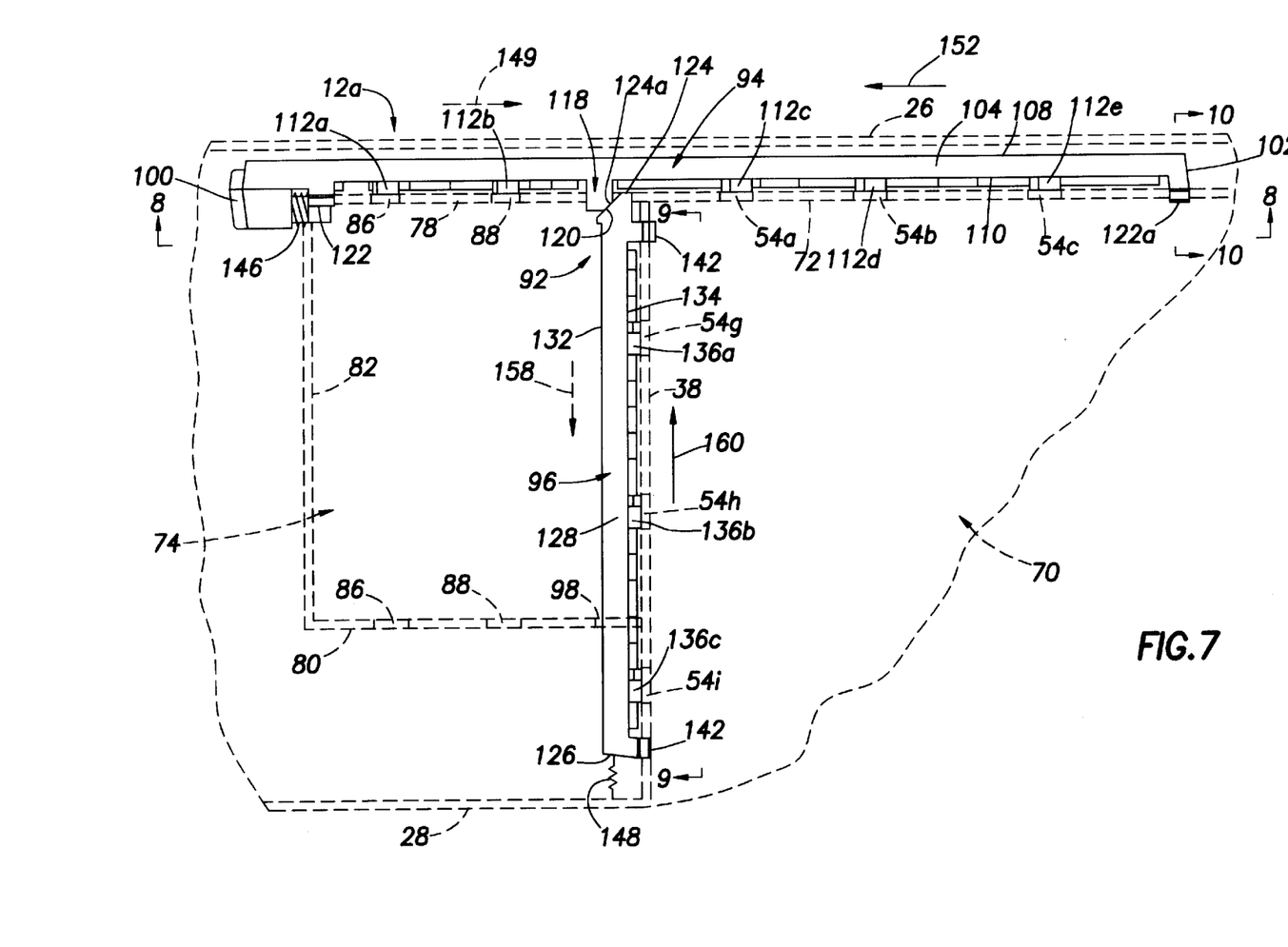
FIG. 7 is an enlarged scale, partially phantomed cross-sectional view through a portion of the drive support structure taken along line 7—7 of FIG. 6.

A corner portion of an alternate embodiment 12a of the previously described computer housing 12 is illustrated in simplified form in FIGS. 6 and 7 and includes the square front side opening 36. Opening 36 extends inwardly into a rectangular drive bay portion 70 disposed within the housing 12a and defined by a portion of a sheet metal chassis structure therein. The previously described support slots 54 are formed as shown in the top, bottom, left and right side walls of the drive bay 70. The drive bay 70 has a top side wall 72 that underlies the housing top side wall 26 which may be removed to expose the drive bay 70.

In the housing 12a a second, somewhat smaller rectangular drive bay 74 is formed immediately to the left of the left vertical side wall 38 of the drive bay 70 and opens outwardly through a rectangular opening 76 in the front housing side wall 16. Drive bay 74 is bounded on the right by the vertical side wall 38, and further has top, bottom and left side walls 78,80 and 82. The drive bay 74 is representatively sized to removably receive two rectangular hard drives 84, only one of which is illustrated in FIG. 6. Opposed pairs of slots 86,88 are formed in the top and bottom side walls 78,80 and extend rearwardly into the drive bay 74.

Each slot pair 86,88 is adapted to slidably receive mounting projections, such as front and rear mounting screws 90a,90b, disposed on opposite side edge portions of the drive 84 as the drive 84 is rearwardly inserted through the opening 76 into the drive bay 74. With the previously described bezel assembly 18 (see FIG. 4) installed on the front side of the housing 12a, the bezel body 30 covers the left drive bay opening 76, and the bezel body opening 34 is aligned (as previously described herein) with the right drive bay opening 36.

According to a feature of the present invention, the inserted hard drive 84, and the inserted floppy drive 40 in either of its desktop and tower orientations, are automatically and releasably latched into place within their associated drive bays, in response to insertion of such drives, by a specially designed drive latch mechanism 92 disposed within the housing 12a and accessible upon removal of the top housing side wall 26, the drive latch mechanism 92 including two transversely oriented elongated latch members 94 and 96. Representatively, latch members 94 and 96 are plastic moldings.

As viewed in FIGS. 6 and 7, latch member 94 longitudinally extends horizontally along a rear top side portion of the drive bays 70 and 74, with the length of the latch member 94 extending parallel to the front housing side wall 16. Latch member 96 longitudinally extends vertically from the underside of the horizontal latch member 94, downwardly along the left side of the interior support cage structure wall 38, and downwardly through a suitable opening 98 in the bottom wall 80 of the drive cage 74 (see FIG. 7).

Figure 8:
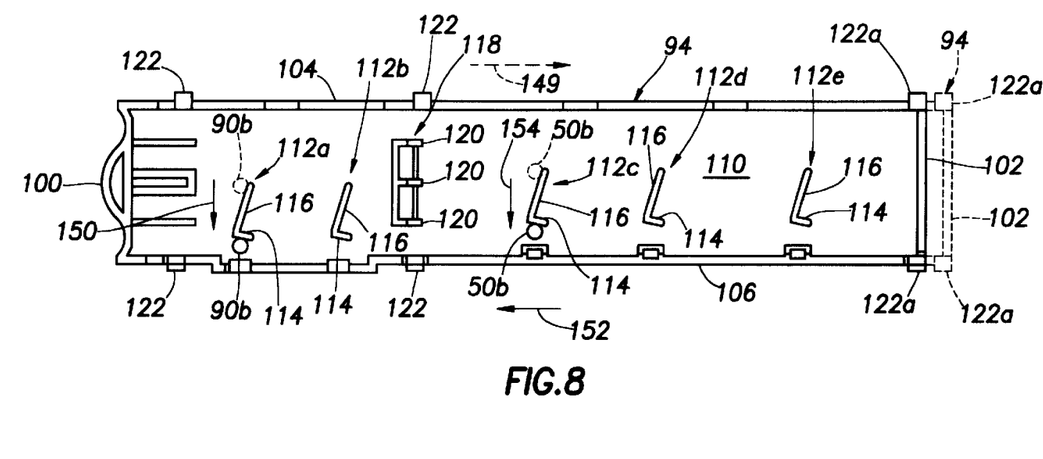
FIG. 8 is a slightly reduced scale bottom plan view of a first latch member portion of the drive latch mechanism taken along line 8—8 of FIG. 7.
Figure 8A:
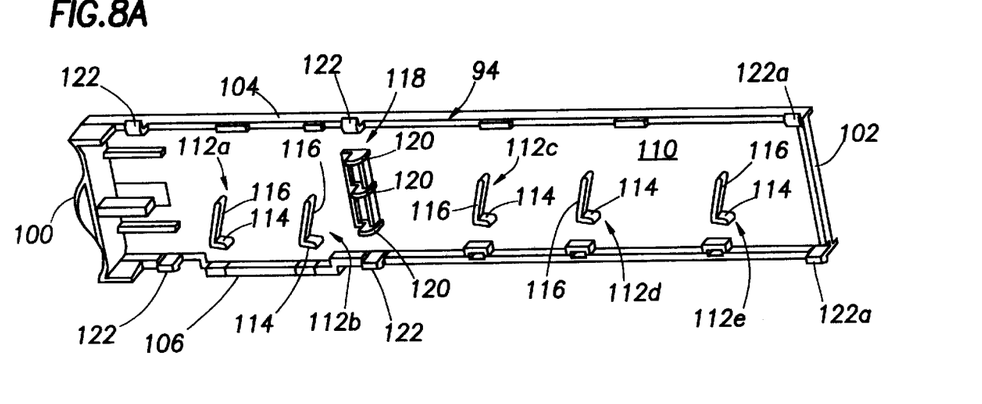
FIG. 8A is a bottom side perspective view of the first latch member.

Turning now to FIGS. 8 and 8A, the top latch member 94 (as viewed with the computer housing 12a in its horizontal desktop orientation) has an elongated rectangular, plate-like body having left and right ends 100 and 102, front and rear side edges 104 and 106 extending between the left and right ends 100 and 102, and top and bottom sides 108 and 110.

Projecting downwardly from the bottom side 110 inwardly adjacent the rear side edge 106 are five longitudinally spaced apart, generally L-shaped locking members designated, from left to right along the latch member 94, by the reference numerals 112a–112e. Each locking member 112 has a rear side leg 114 which is parallel to the rear side edge 106, and a longer front leg 116 which, as viewed in FIGS. 8 and 8A, extends forwardly from the left end of leg 114 at a forwardly and rightwardly sloped angle. Also projecting downwardly from the bottom side 110, between the locking members 112b and 112c, is a cam structure 118 having, along a bottom right side portion thereof, sloping cam surfaces 120. Spaced along the front and rear side edges 104,106 are downwardly projecting attachment hook members 122 including a laterally opposed pair 122a adjacent the right end 102 of the latch member 94.

Figure 9:
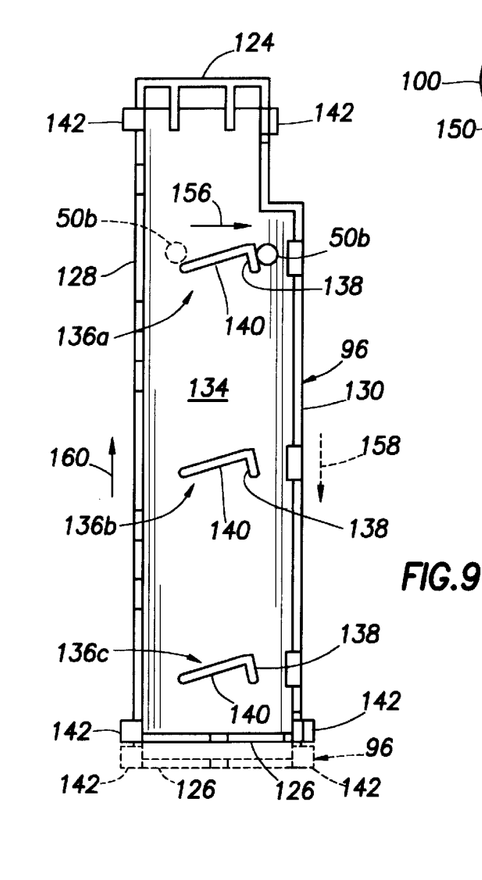
FIG. 9 is a slightly reduced scale right side elevational view of a second latch member portion of the drive latch mechanism taken along line 9—9 of FIG. 7.
Figure 9A:
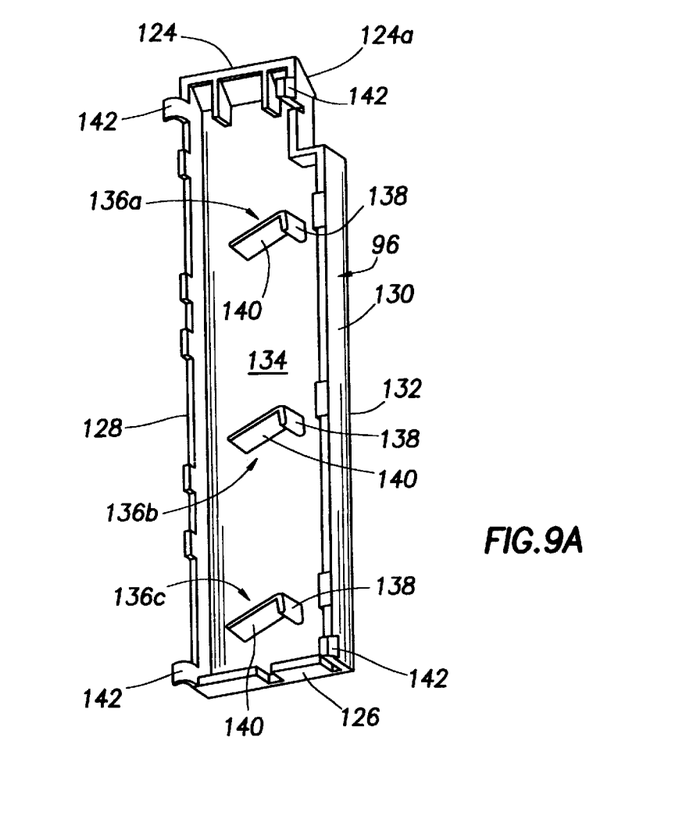
FIG. 9A is a right side elevational view of the second latch member.

With reference now to FIGS. 9 and 9A, the second latch member 96 has an elongated rectangular plate-like body with top and bottom ends 124 and 126, front and rear side edges 128 and 130 extending between the top and bottom ends 124 and 126, and (as viewed in FIGS. 6 and 7) left and right sides 132 and 134. As best illustrated in FIGS. 7 and 9A, the top end 124 has an inclined end face 124a thereon.

Projecting outwardly from the right side 134 are three longitudinally spaced apart, generally L-shaped locking members designated, from top to bottom along the latch member 96, by the reference numerals 136a–136c. Each locking member 136 has a rear side leg 138 which is parallel to the rear side edge 130, and a longer front leg 140 which, as viewed in FIGS. 9 and 9A, extends forwardly from the top end of leg 138 at a forwardly and downwardly sloped angle. Positioned on the top and bottom ends of the front and rear side edges 128,130 are rightwardly projecting attachment hooks 142.

Figure 10:
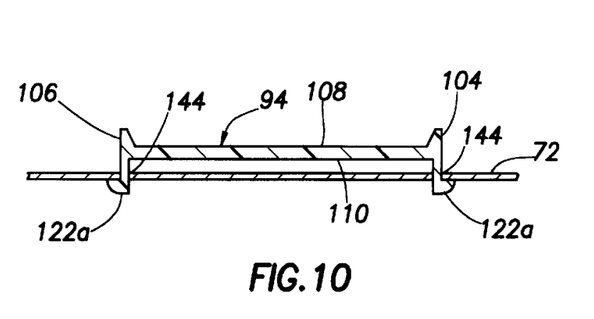
FIG. 10 is an enlarged scale cross-sectional view through the first latch member taken along line 10—10 of FIG. 7.

The horizontal upper latch member 94 is slidably supported on the top side walls 72,78 of the drive bays 70,74 by snapping the attachment hooks 122 of the latch member 94 into slots 144 formed in these top side walls and longitudinally extending parallel to the front housing wall 16. FIG. 10 representatively illustrates the sliding receipt of the attachment hooks 122a in slots 144 formed in the top wall 72 of the right drive bay 70. The slidably mounted upper latch member 94 interacts with the cage structure in a manner permitting the latch member to be longitudinally moved between a solid line latching position shown in FIGS. 7 and 8, and a rightwardly shifted unlatching position shown in phantom in FIG. 8. A schematically depicted spring member 146 shown in FIGS. 6 and 7 is interposed between the left end 100 of the upper latch member 94 and the vertical cage wall 82 and resiliently biases the latch member 94 leftwardly toward its solid line latching position.

The vertical latch member 96 is slidably mounted on the left side of the vertical cage wall 38, by the receipt of the attachment hooks 142 in vertical slots (not shown) in the wall 38, for vertical movement between the solid line latching position of the latch member 96 shown in FIGS. 7 and 9 and the downwardly shifted unlatching position shown in phantom in FIG. 9. A schematically depicted compression spring member 148 is operatively interposed between the bottom end 126 of the vertical latch member 96 and the bottom wall 28 of the housing 12a (see FIGS. 6 and 7) and resiliently biases the latch member 96 upwardly toward its solid line latching position. With each of the latch members 94,96 in its solid line latching position (see FIG. 7) the sloped upper end face 124a of the vertical latch member 94 complementarily engages the sloping surfaces 120 of the upper latch member cam structure 118.

When the hard drive 84 is rearwardly inserted into the drive bay 74 with, for example, the drive mounting projections 90a,90b (see FIG. 6) received in the vertically opposing slot pair 86, the upper rear drive mounting projection 90b (see FIG. 8) forcibly engages the front leg 116 of the locking member 112a on the upper latch member 94 in a manner thereby causing the rightward deflection of the latch member 94 from its solid line latching position to its unlatching position shown in phantom in FIG. 8 as indicated by the dashed arrows 149 in FIGS. 7 and 8.

When the mounting projection 90b rearwardly passes the deflected locking member 112a, as indicated by the arrow 150 in FIG. 8, the spring 146 (see FIG. 7) leftwardly returns the latch member 94 to its solid line latching position as indicated by the arrows 152 in FIGS. 7 and 8. When this occurs, the drive projection 90b is positioned behind the rear side leg 114 of the locking member 112a so that the rear side leg 114 blocks the forward movement of the projection 90b, thereby preventing the forward removal of the inserted hard drive 84.

To remove the inserted hard drive 84, the upper latch member 94 is simply manually moved rightwardly to its phantomed unlatching position, as indicated by the arrow 149, to rightwardly shift the leg 114 of the locking member 112a out of blocking relationship with the drive projection 90b and permit the forward removal of the inserted hard drive 84.

In a similar manner, the floppy drive 40 in its solid line tower orientation shown in FIG. 6 may be rearwardly inserted into the drive bay 70 and automatically latched therein by, for example, slidably moving the drive projection pairs 50a,50b rearwardly through the vertically opposed cage slots 54a,54d. As the upper rear mounting projection 50b (see FIG. 8) engages the front leg 116 of the locking member 112c, it rightwardly deflects the locking member 112c, and thus the upper latch member 94, as indicated by the dashed arrows 149 in FIG. 7 and 8. As the mounting projection 50b rearwardly passes the locking member 112c, as indicated by the arrow 154 in FIG. 8, the spring 146 leftwardly shifts the latch member 94 back to its solid line latching position, as indicated by the arrows 152 in FIGS. 7 and 8, at which point the drive projection 50b is positioned behind and blocked by the rear leg 114 of the locking member 112c to thereby prevent forward removal of the inserted floppy drive 40.

To remove the drive 40, the latch member 94 is simply pushed rightwardly to its phantomed unlatching position to unblock the mounting projection 50b and permit forward removal of the drive 40 from the cage structure 70.

The floppy drive 40 (or other type of drive or modular device as the case may be) in its dotted line desktop orientation shown in FIG. 6 may be inserted into the drive bay 70 and automatically latched therein by, for example, slidably moving the drive mounting projections 50a,50b rearwardly through the horizontally opposed slots 54g,54j. As illustrated in FIG. 9, the left rear drive projection 50b rearwardly engages the front leg 140 of the locking member 136a and, as indicated by the arrow 156 in FIG. 9, rearwardly passes it. As the projection 50b rearwardly passes the locking member 136a, the forcible engagement between the projection 50b and the leg 140 downwardly cams the latch member 96 from its solid line latching position to its phantomed unlatching position, as indicated by the dashed arrows 158 in FIGS. 158 in FIGS. 7 and 9, against the resilient resistance of the spring member 148 (see FIG. 7).

After the projection 50b rearwardly passes the locking member 136, the spring 148 upwardly returns the downwardly deflected latch member 96 to its solid line latching position as indicated by the arrows 160 in FIGS. 7 and 9. When this occurs, the drive mounting projection 50b, as shown in FIG. 9, becomes blocked behind the rear leg 138 of the locking member 136a, thereby preventing forward removal of the inserted floppy disk drive 40.

When it is desired to remove the floppy disk drive 40 in its desktop orientation, the upper latch member 94 (see FIG. 7) is simply pushed rightwardly, as indicated by the dashed arrow 149, to its rightwardly deflected unlatching position. Via the resulting interaction between the contacting cam surfaces 120,124a on the horizontal latch member 94 and the vertical latch member 96, this rightward manual shifting of the horizontal latch member 94 automatically shifts the vertical latch member 96 downwardly to its phantomed unlatching position shown in FIG. 9 to permit removal of the inserted floppy disk drive 40. When the drive 40 is removed and the horizontal latch member 94 released, the springs 146,148 automatically return the latch members 94,96 to their solid line latching positions shown in FIGS. 7–9.

Thus, in accordance with an aspect of the present invention, the drive 40 in either of its desktop and tower orientations is automatically latched within the drive bay 70 in automatic response to the insertion of the drive 40 into the drive bay 40. Furthermore, with the top housing wall 26 removed to provide access to the latch member 94, a single portion of the latch mechanism (namely, the latch member 94) may be moved to unlatch and permit removal of the inserted drive 40 in both of its mutually perpendicular desktop and tower orientations.

While the insertion and latching of the hard drive 84 has been described in conjunction with the locking member 112*a*, it will be appreciated that hard drive 34 (or another hard drive inserted into the drive bay 74) could also cooperate with the locking member 112*b* to effect the latching action of the latching member 94. The actions of the other locking members 112*d*,112*e* would be similar to the described action of the locking member 112*c*, and the actions of the locking members 136*b*,136*c* would be similar to the described action of the locking member 136*a* when other drives or other types of modular devices in either desktop or tower orientations are inserted into drive bay 70.

The foregoing detailed description is to be clearly understood as being given byway of illustration and example only, the spirit and scope of the present invention being limited solely by the appended claims.

What is claimed is:

1. Electronic apparatus comprising:

a housing having a first exterior wall with an opening therein through which a modular device having a side may be inwardly inserted, and a second exterior wall transverse to said first exterior wall;

a support structure operative to support the inserted modular device in a selectively variable one of (1) a first orientation in which the modular device side is parallel to said second exterior wall, and (2) a second orientation in which the modular device side is transverse to said second exterior wall; and a latch structure, movably carried by said housing and operative in response to the insertion of the modular device through said opening in either of said first and second orientations, for releasably latching the inserted modular device in said housing, said latch structure having a single portion movable relative to said housing to permit removal of the releasably latched modular device in either of said first and second orientations.

2. The electronic apparatus of claim 1 wherein said latch structure includes first and second transverse latch members respectively movable relative to said housing in unlatching directions parallel to and transverse to said second exterior wall, said first and second latch members having cooperatively engaged portions operative to move said second latch member in its unlatching direction in response to movement of said first latch member in its unlatching direction.

3. The electronic apparatus of claim 2 wherein said first and second transverse latch members are resiliently biased toward latching positions thereof.

4. The electronic apparatus of claim 3 wherein each of said first and second latch members is elongated in its latching direction and is slidably supported for movement between the latching and unlatching position of the latch member.

5. The electronic apparatus of claim 3 wherein:

each of said first and second latch members has a locking structure thereon which is configured to be engaged by a portion of the inserted modular device in a manner deflecting the latch member from its latching position to its unlatching position and then permitting it to be resiliently driven back to its latching position.

6. The electronic apparatus of claim 3 wherein said first latch member has a cam structure thereon which, in response to movement of said first latch member from its latching position to its unlatching position, engages a portion of said second latch member and drives said second latch member from its latching position to its unlatching position.

7. The electronic apparatus of claim 1 wherein:

said electronic apparatus is a computer, and said support structure is operative to support in said first orientation a drive unit inserted into said opening.

8. The electronic apparatus of claim I wherein:

said opening has a rectangular configuration with first and second pairs of opposing sides, and said support structure includes a first portion associated with said first pair of opposing sides and operative to receive opposite side portions of a modular device inserted into said opening, and a second portion associated with said second pair of opposing sides and operative to receive opposite side edge portions of a modular device inserted into said opening.

9. The electronic apparatus of claim 8 wherein said opening has a square configuration.

10. The electronic apparatus of claim 1 further comprising a bezel structure including:

a body portion having an opening therein, said body portion being removably securable to the outer side of said first exterior wall with said bezel body portion opening outwardly overlying said first exterior housing wall opening, and a blank-off structure removably securable to said body portion in mutually perpendicular orientations and operative to blank off a selected area of said first exterior housing wall opening unoccupied by a modular device.

11. The electronic apparatus of claim 10 wherein said blank-off structure includes:

a blank-of member, and means for removably securing said blank-off member to said body portion to extend across a portion of said opening therein.

12. The electronic apparatus of claim 11 wherein said means for removably securing include a frame member removably securable to said body portion, in mutually perpendicular orientations relative thereto, around said opening therein, and means for removably securing said blank-off member to said frame member to extend across and cover an interior portion thereof.

13. The electronic apparatus of claim 12 wherein said body portion of said bezel structure is snap-fittable onto said first exterior wall of said housing, said frame member is snap-fittable onto said body portion of said bezel structure, and said blank-off member is snap-fittable onto said frame member.

14. Electronic apparatus comprising:

a housing having a first exterior wall with an opening therein, said opening having first and second pairs of opposing sides, and a second exterior wall transverse to said first exterior wall;

a first opposing pair of support structures extending from said first pair of opposing sides into the interior of said housing and being operative to slidably and supportingly engage opposite portions of a modular device inserted into said opening in a first orientation;

a second opposing pair of support structures extending from said second pair of opposing sides into the interior of said housing and being operative to slidingly and supportingly engage opposite portions of the modular device inserted into said opening in a second orientation transverse to said first orientation; and a latch structure, movably carried by said housing and operative in response to the insertion of the modular device through said opening in either of said first and second orientations and engagement of said latch structure by one of the opposite portions of the inserted modular device, for releasably latching the inserted modular device in said housing, said latch structure having a single portion movable relative to said housing to permit removal of the releasably latched modular device in either of said first and second orientations.

15. The electronic apparatus of claim 14 wherein said latch structure includes first and second transverse latch members respectively movable relative to said housing in unlatching directions parallel to and transverse to said second exterior wall, said first and second latch members having cooperatively engaged portions operative to move said second latch member in its unlatching direction in response to movement of said first latch member in its unlatching direction.

16. The electronic apparatus of claim 15 wherein said first and second transverse latch members are resiliently biased toward latching positions thereof.

17. The electronic apparatus of claim 16 wherein each of said first and second latch members is elongated in its latching direction and is slidably supported for movement between the latching and unlatching position of the latch member.

18. The electronic apparatus of claim 16 wherein:

each of said first and second latch members has a locking structure thereon which is configured to be engaged by one of the opposite portions of the inserted modular device in a manner deflecting the latch member from its latching position to its unlatching position and then permitting it to be resiliently driven back to its latching position.

19. The electronic apparatus of claim 16 wherein said first latch member has a cam structure thereon which, in response to movement of said first latch member from its latching position to its unlatching position, engages a portion of said second latch member and drives said second latch member from its latching position to its unlatching position.

20. The electronic apparatus of claim 14 wherein said housing is a computer housing.

21. The electronic apparatus of claim 14 wherein said opening has a square configuration.

22. The electronic apparatus of claim 21 wherein each of said support structures defines a slot longitudinally extending from said opening inwardly into the interior of said housing.

23. Computer apparatus selectively configurable in both desktop and tower orientations, comprising:

a housing having a first exterior wall with an opening therein, and a second exterior wall transverse to said first exterior wall;

a modular device having a side and being insertable inwardly through said opening in a selectively variable one of (1) a desktop orientation in which said modular device side is parallel to said second exterior wall, and (2) a tower orientation in which said modular device side is transverse to said second exterior wall;

a support structure operative to support the inserted modular device in either of the desktop and tower orientations thereof; and a latch structure, movably carried by said housing and operative in response to the insertion of said modular device through said opening in either of said desktop and tower orientations, for releasably latching the inserted modular device in said housing, said latch structure having a single portion movable relative to said housing to permit removal of the releasably latched modular device in either of said desktop and tower orientations.

24. The computer apparatus of claim 23 wherein said latch structure includes first and second transverse latch members respectively movable relative to said housing in unlatching directions parallel to and transverse to said second exterior wall, said first and second latch members having cooperatively engaged portions operative to move said second latch member in its unlatching direction in response to movement of said first latch member in its unlatching direction.

25. The computer apparatus of claim 24 wherein said first and second transverse latch members are resiliently biased toward latching positions thereof.

26. The computer apparatus of claim 25 wherein each of said first and second latch members is elongated in its latching direction and is slidably supported for movement between the latching and unlatching position of the latch member.

27. The computer apparatus of claim 25 wherein:

each of said first and second latch members has a locking structure thereon which is configured to be engaged by a portion of the inserted modular device in a manner deflecting the latch member from its latching position to its unlatching position and then permitting it to be resiliently driven back to its latching position.

28. The computer apparatus of claim 25 wherein said first latch member has a cam structure thereon which, in response to movement of said first latch member from its latching position to its unlatching position, engages a portion of said second latch member and drives said second latch member from its latching position to its unlatching position.

29. The computer apparatus of claim 23 wherein said modular device is a storage media drive unit.

30. The computer apparatus of claim 23 wherein said opening has a square configuration.

31. The computer apparatus of claim 30 wherein: said support structure extends inwardly into said housing from spaced apart peripheral portions of said opening.

32. The computer apparatus of claim 30 wherein:

said modular device has a pair of opposite side edge portions with spaced projections thereon, said opening has a square configuration with first and second opposing sides extending transverse to said second exterior wall, and third and fourth opposing sides extending parallel to said second exterior wall, and said support structure includes wall means for defining (1) a first pair of opposing slots longitudinally extending into the interior of said housing from said first and second opposing sides of said opening and configured to slidingly receive said projections when said modular device is in said desktop orientation, and (2) a second pair of opposing slots longitudinally extending into the interior of said housing from said third and fourth opposing sides of said opening and configured to slidingly receive said projections when said modular device is in said tower orientation.

33. The computer apparatus of claim 23 further comprising a bezel structure including:

a body portion having an opening therein, said body portion being removably securable to the outer side of said first exterior wall with said bezel body portion opening outwardly overlying said first exterior housing wall opening, and a blank-off structure removably securable to said body portion in mutually perpendicular orientations and operative to blank off a selected area of said first exterior housing wall opening unoccupied by a modular device.

34. The computer apparatus of claim 33 wherein said blank-off structure includes:

a blank-off member, and means for removably securing said blank-off member to said body portion to extend across a portion of said opening therein.

35. The computer apparatus of claim 34 wherein said means for removably securing include:

a frame member removably securable to said body portion, in mutually perpendicular orientations relative thereto, around said opening therein, and means for removably securing said blank-off member to sid frame member to extend across and cover an interior portion thereof.

36. The computer apparatus of claim 35 wherein said body portion of said bezel structure is snap-fittable onto said first exterior wall of said housing, said frame member is snap-fittable onto said body portion of said bezel structure, and said blank-off member is snap-fittable onto said frame member.

* * * * *